United States Patent
Viswanathan et al.

(10) Patent No.: US 6,941,052 B2
(45) Date of Patent: Sep. 6, 2005

(54) SENSITIZED OPTICAL FIBER METHOD AND ARTICLE

(75) Inventors: Nirmal K. Viswanathan, Austin, TX (US); Harvey W. Kalweit, Burnsville, MN (US)

(73) Assignee: 3M Innovative Properties Company, St. Paul, MN (US)

(*) Notice: Subject to any disclaimer, the term of this patent is extended or adjusted under 35 U.S.C. 154(b) by 316 days.

(21) Appl. No.: 10/325,582

(22) Filed: Dec. 19, 2002

(65) Prior Publication Data

US 2004/0120643 A1 Jun. 24, 2004

(51) Int. Cl.[7] ............................ G02B 6/16; C03B 37/02
(52) U.S. Cl. ......................... 385/123; 385/142; 65/392
(58) Field of Search ........... 65/385, 392; 385/123–128, 385/141–142

(56) References Cited

U.S. PATENT DOCUMENTS

| | | | |
|---|---|---|---|
| 5,978,538 A | | 11/1999 | Miura et al. |
| 6,347,171 B1 | * | 2/2002 | Tatah et al. .................... 385/37 |
| 6,434,314 B1 | | 8/2002 | Gatica et al. |
| 6,573,026 B1 | * | 6/2003 | Aitken et al. ............... 430/290 |
| 2003/0110810 A1 | * | 6/2003 | Dunn et al. .................... 65/392 |

FOREIGN PATENT DOCUMENTS

WO    WO 01/09899 A1    2/2001

OTHER PUBLICATIONS

Yuki Kondo, Kentaro Nouchi and Tsuneo Mitsuyu, "Fabrication of long–period fiber gratings by focused irradiation of infrared femtosecond laser pulses", Optics Letters, vol. 24, No. 10, May 15, 1999, pp. 646–648.

Eric Fertein, Christophe Przygodzki, Herve Delbarre, Arif Hidayat, Marc Douay and Pierre Niay, "Refractive–index changes of standard telecommunication fiber through exposure to femtosecond laser pulses at 810 cm", Applied Optics, vol. 40, No. 21, Jul. 20, 2001, pp. 3506–3508.

* cited by examiner

Primary Examiner—Akm Enayet Ullah
Assistant Examiner—Jerry T Rahll
(74) Attorney, Agent, or Firm—Gregg H. Rosenblatt

(57) ABSTRACT

A refractive index grating comprising an optical fiber having at least one radiation-sensitized portion, in a longitudinal section of the optical fiber, containing a periodic variation of refractive index. The refractive index grating has an initial magnitude that changes no more than two percent after conditioning at a temperature of 300° C. for a time of ten minutes.

2 Claims, No Drawings

SENSITIZED OPTICAL FIBER METHOD AND ARTICLE

BACKGROUND OF THE INVENTION

1. Field of the Invention

The invention relates to optical waveguide devices produced by periodic variation of refractive index in glass substrates including glass optical fibers. More particularly the present invention provides a method employing exposure to energy from pulsed lasers, emitting femtosecond pulses in the near infrared region, to increase the sensitivity of glass to refractive index modifying laser energy emitted in the ultraviolet region of the spectrum to produce optical waveguide devices, also referred to herein as Bragg gratings.

2. Description of the Related Art

Throughout the centuries glass has been used in a variety of scientific and domestic applications to advance the capabilities of modern society. From the early use of prismatic glass for separating light into its component colors, glass has been widely used in optical devices that control or adjust the properties of light beams. A recent and rapidly expanding application of the light modifying properties of glass structures involves the drawing of fine filaments of highly purified glass, more commonly referred to as optical fibers, that direct light signals between light transmitting and receiving locations.

During the late 1970s, utilities began using optical fiber installations for internal communication, and by the early 1980s, a number of small optical fiber networks were installed. The use of such networks has grown to replace previously existing coaxial cable systems. Advantages provided by optical fiber communications networks include lower cost, the use of fewer signal repeaters to correct for signal distortion, and a higher signal carrying capacity than coaxial cable networks.

Special features may be built into selected lengths of optical fibers to be spliced into fiber optic networks. A fiber Bragg grating represents a light-modifying feature that may be introduced or written into an optical fiber by exposure to ultraviolet light. The process of introducing special features such as Bragg gratings into an optical fiber may include a number of steps requiring handling of relatively short lengths of optical fiber during a series of manufacturing operations. An optical fiber typically requires removal of protective coatings before changing the physical characteristics of the fiber to include a Bragg grating. After writing a Bragg grating, the fiber may be annealed and recoated to protect the optical fiber and its imprinted waveguide from physical damage or attack by environmental contaminants.

The magnitude of change in the refractive index of glass substrates, exposed to ultraviolet laser energy, depends upon the sensitivity of the glass to the ultraviolet radiation. It is known that silica glass substrates, such as optical fibers, may be treated to include chemical elements such as germanium in their structure. This produces germano-silicate glasses, which have increased sensitivity to ultraviolet radiation. Further increases in sensitivity to ultraviolet radiation have been achieved using a process known as hydrogen loading. The process of hydrogen loading involves treating glass in an environment of hydrogen at high pressures and elevated temperatures that promote hydrogen diffusion into the glass. Hydrogen-loaded germano-silicate fibers represent the current substrate of choice for manufacture of glass fiber-containing refractive index gratings resulting from exposure to ultraviolet radiation. Such gratings exhibit a marked variation in the magnitude of periodic refractive index change ($\Delta n$) along the length of a grating. The magnitude of refractive index change is known to diminish during the process of grating stabilization, involving high temperature annealing. It is believed that annealing causes some loss of hydrogen and other species that affect the magnitude of refractive index change.

The periodicity of refractive index change varies depending upon the wavelength of radiation and the dimensions of the beam impinging on a glass substrate to change its refractive index. Preceding description of the use of ultraviolet radiation relates to the production of refractive index or Bragg gratings having wavelength characteristics required for fiber optic communications networks. Other types of radiation may cause changes in glass to provide gratings having different periodic spacing of the refractive index variation from those produced using ultraviolet radiation. An example of this is the known use of lasers emitting pulses of energy at femtosecond pulse widths in the near infrared (NIR) region of the spectrum to produce permanent refractive index changes in various glasses.

Devices such as waveguides, couplers and diffraction gratings have been formed by refractive index modification of glass. U.S. Pat. No. 5,978,538 describes a femtosecond laser process for forming optical waveguides in the interior of oxide, halide, and chalcogenide glasses. According to the description of published application WO 01/09899, a femtosecond laser process effects direct writing of light guiding structures into the bulk of soft, silica-based glasses. Other references to refractive index change in glass by exposure to femtosecond laser pulses exists in descriptions by Kondo et al in Optics Letters, Vol. 24, page 646, 1999 and Fertein et al in Applied Optics, Vol. 40, page 3506, 2001.

Refractive index changes in glass result from multiphoton photochemical reactions during exposure to femtosecond laser pulses. Exposure to short femtosecond energy pulses in this way yields waveguides that, unlike hydrogen-loaded glasses, retain a relatively stable change in the magnitude of refractive index variation. Although changes in refractive index remain relatively stable, visible defects accompany waveguide formation in several glasses including silica and germano-silicate glasses. The defects compromise the mechanical strength of optical fibers after fabrication of optical devices such as optical fiber waveguides. This suggests that near infrared laser pulses, operating at femtosecond pulse widths, are unsuitable for use with optical fibers, due to the occurrence of damage to the processed glass. A further disadvantage of near infrared femtosecond laser pulses is the minimum diffraction-limited spot size obtainable by focusing lasers of this type. The minimum spot sizes achievable after laser beam focusing, in this case, is approximately 2 $\mu$m–3 $\mu$m. Bragg gratings having suitable wavelength characteristics for telecommunications applications require focusing of the exposing laser beam to produce fringe periodicity of approximately 0.5 $\mu$m.

With increased growth of fiber optic telecommunications networks, there will be increasing demand for optical fiber devices including modified glass structures, such as Bragg gratings. In anticipation of this demand there is a need for a process to produce devices, free from mechanical defects, that remain stable after formation.

SUMMARY OF THE INVENTION

The present invention provides a process employing a pulsed near-infrared laser, operating at femtosecond pulse widths, to provide sensitized germano-silicate glasses, preferably in the form of optical fibers, in which periodic changes in refractive index may be induced by exposure to laser energy of ultraviolet wavelengths. Refractive index gratings according to the present invention may be written into an optical fiber in less time than that required for modifying optical fibers not previously sensitized by femtosecond laser treatment. The process is free from defects that compromise glass strength. Bragg gratings written in the femtosecond laser sensitized fibers show approximately two to three times enhancement in writing efficiency. This translates into improvement in the maximum achievable refractive index change compared to otherwise untreated germano-silicate fibers. Bragg gratings according to the present invention are stable at elevated temperture if formed in the core of femtosecond laser sensitized optical fibers using a continuous wave frequency doubled argon ion laser operating at a wavelength of 244 nm. Consequently, post-fabrication annealing, used for hydrogen-loaded optical fibers, is not required when femtosecond laser sensitizing is part of the process for fabricating fiber Bragg gratings.

In general, the process for fabricating a Bragg grating in a radiation-sensitized portion of an optical fiber comprises selecting coated optical fibers, formed and coated in a draw tower, from glass pre-forms containing differing amounts of germanium oxide. Selected lengths in the germanium doped fibers, after exposure to the focused beam of a near infrared femtosecond laser, provide radiation sensitized optical fibers containing portions having greater sensitivity to ultraviolet radiation than untreated optical fibers. Conditions of exposure to a femtosecond laser emitting in the near infrared will vary depending upon the power of the laser, the spot size of the laser beam modified by optical focusing means, and the scan rate of the focused beam within the limits of the treated length of the optical fiber. Radiation sensitization of germano-silicate optical fibers was demonstrated without removing protective coatings from the core and cladding of optical fibers produced in a draw tower. Enhancement of optical fiber photosensitivity according to the present invention approaches a desirable maximum level without any visible damage to the glass or reduction of mechanical strength of the optical fiber.

Formation of refractive index or Bragg gratings in a radiation sensitized optical fiber according to the present invention first requires removal of one or more protective polymer coatings that attenuate the intensity of the beam of the ultraviolet laser used for index of refraction modulation within the core of the sensitized fiber. Conversion of the resulting bare optical fiber, to include a refractive index grating, requires exposure of the radiation sensitized portion of the optical fiber to a pattern of ultraviolet radiation using any one of a number of known methods for forming Bragg gratings. After formation of a grating in the core of the optical fiber, application of a polymer recoat protects the vitreous surface from which coating was removed previously. Optical fiber annealing after formation of a Bragg grating is not required for optical fibers sensitized by exposure to a pulsed near infrared laser emitting an average pulse power of less than about 10 mW at femtosecond pulse widths.

More particularly, the present invention provides a refractive index grating comprising an optical fiber having at least one radiation-sensitized portion, in a longitudinal section of the optical fiber, to contain a periodic variation of refractive index. The periodic variation of refractive index has an initial magnitude that changes no more than two percent after conditioning at a temperature of 300° C. for a time of ten minutes.

The present invention also provides a process for fabricating a radiation sensitized optical fiber containing at least one portion having increased sensitivity to ultraviolet radiation. The process comprises a number of steps including, forming an optical fiber from a pre-form comprising germano-silicate glass and coating the optical fiber with at least one buffer to protect the optical fiber from damage. Exposure of at least one portion of the optical fiber to pulsed energy from a near infrared laser, generating pulses at femtosecond pulse widths of 100 fsec, and a repetition frequency of 1 kHz, provides the radiation sensitized optical fiber. Further processing of the sensitized optical fiber includes removing the at least one buffer from the at least one portion of the radiation sensitized optical fiber and exposing the at least one portion to a pattern of ultraviolet radiation to produce a periodic variation of refractive index in the at least one portion of the radiation sensitized optical fiber. This provides a refractive index grating in the portion of the radiation sensitized optical fiber.

Definitions

The meanings of terms included in the present application are defined as follows:

The term "sensitization exposure" refers to the use of femtosecond laser pulses to scan the fiber through its coating to increase the intrinsic photosensitivity of the optical fiber to ultraviolet wavelength radiation.

The term "femtosecond laser" refers to a pulsed laser emitting radiation at pulse widths between $10^{-15}$ sec and $6 \times 10^{-13}$ sec.

The term "radiation sensitized" refers to the condition of germanium doped optical fibers after exposure to the focused beam of a near infrared femtosecond laser to provide radiation sensitized optical fibers containing portions having greater sensitivity to modification by ultraviolet radiation than untreated optical fibers.

The term "change of index of refraction" refers to the effect of subjecting a sensitized optical fiber to radiation from an ultraviolet laser causing the initial refractive index of the optical fiber to be changed to a different value, which allows the fabrication of refractive index gratings.

Terms such as "magnitude of change of index of refraction" or "magnitude of refractive index change" refer to the amount of change in refractive index, represented by the symbol $\Delta n$, that occurs during exposure of a sensitized glass body, preferably an optical fiber, to radiation from an ultraviolet laser.

DETAILED DESCRIPTION OF THE PREFERRED EMBODIMENT

As required, detailed embodiments of the present invention are disclosed herein; however, it is to be understood that the disclosed embodiments are merely exemplary of the invention that may be embodied in various and alternative forms. Specific structural and functional details disclosed herein are not to be interpreted as limiting, but merely as a basis for the claims and as a representative basis for teaching one skilled in the art to variously employ the present invention.

Manufacture of optical fibers, used for formation of optical fiber refractive index gratings, typically involves drawing of glass filaments from highly photosensitive glass pre-forms. The process uses a down-feed system to control the rate at which a highly photosensitive optical glass pre-form, containing germanium optionally co-doped with boron, enters the heating zone of an induction furnace. Heating zone temperatures reach from about 2200° C. to about 2250° C. Within this temperature range an optical pre-form may be drawn to the filamentary form of an optical fiber. A laser telemetric measurement system monitors the diameter of the optical fiber and its position in the draw tower. Thereafter, the newly formed optical fiber passes through at least one coating station for application of at least one UV curable, protective coating.

Coated optical fibers according to the present invention may be drawn, as described above, to include from about 5 mole % to about 10 mole % germanium oxide. Further processing of germano-silicate fibers of this type includes a sensitization step that further enhances the sensitivity of the core of the glass optical fiber to radiation from an ultraviolet laser. Without pre-sensitization, the fabrication of refractive index gratings by exposure to ultraviolet laser energy requires impractical extended times in the path of the laser beam. The degree of development and magnitude of change of index of refraction depends upon the photosensitivity of the absorbing germano-silicate glass during exposure to energy from ultraviolet lasers.

Sensitization techniques are known, which facilitate refractive index changes in silica and glass substrates, particularly optical fibers. Hydrogen sensitization, commonly known as hydrogen loading of optical fibers, requires fiber formation in a suitable draw tower. The process of hydrogen loading of a glass optical fiber involves treatment of the drawn optical fiber with hydrogen at high pressures and elevated temperatures that promote hydrogen diffusion into the glass core of the optical fiber. Hydrogen-loaded germano-silicate fibers represent the current substrate of choice for manufacture of glass fiber-contained refractive index gratings using ultraviolet lasers. Such gratings may be referred to as strong gratings since they exhibit a relatively marked variation in the amount by which the refractive index changes ($\Delta n = \sim 10^{-3}$). It is known that, over an extended period of time, the strength of hydrogen loaded refractive index gratings will diminish as much as 12% or more due to the fugitive nature of hydrogen, which migrates away from the core of the optical fiber. Although the loss is inevitable, the characteristic properties of a Bragg grating may be transformed to a more stable condition using high temperature annealing.

The present invention provides a method for sensitizing germano-silicate optical fibers that respond to patterns of ultraviolet radiation to form refractive index gratings having remarkably stable grating performance characteristics. Loss of grating strength, using this method, is typically less than 2% of the original variation of refractive index. The process of sensitization uses polymer-coated, germano-silicate optical fibers produced in a draw tower, as described above. These optical fibers have a core content of germanium oxide from about 5 mole % to about 10 mole %. A typical length of 2.54 mm (1 inch) of the coated fiber was exposed to pulses of near-infrared radiation having a wavelength of approximately 800 nm. The infrared radiation was generated using a pulsed laser producing femto-second (fsec) laser pulses between about $10^{-15}$ sec and $6 \times 10^{-13}$ sec wide. Conditions of exposure to a femtosecond laser emitting in the near infrared will vary depending upon the power of the laser, the spot size of the laser beam, modified by optical focusing means, and the scanning rate of the focused beam within the limits of the treated length of the optical fiber.

Selected lengths of freshly drawn and coated germano-silicate optical fibers may be conveniently handled for further processing using equipment and methods described in U.S. Pat. No. 6,434,314. The methods outlined therein use a filament organizer for containment and positioning of lengths of optical fiber during several processes associated with the formation of fiber Bragg gratings. A filament organizer provides a convenient holder for a germano-silicate optical fiber during exposure to a pulsed near-infrared laser to increase photosensitivity in at least a portion of the length of the optical fiber.

Using a filament organizer, radiation sensitized optical fibers were produced by exposure to a "Hurricane" model Ti/sapphire laser available from Spectra-Physics, Inc., Mountain View, Calif. The laser operated at a pulse width of 100 fsec, and a repetition frequency of 1 kHz. Output from the laser was converted to a scanning beam using motorized linear translation stage to repeatedly scan a length of the coated fiber selected for sensitization. The scanning beam was focused through the polymer coating and onto the fiber core using a pair of cylindrical lenses placed in the path of the laser beam either before or after the beam reached the scanning mirror device. Beam focusing produced a spot size, at the fiber, of approximately 180 $\mu$m×70 $\mu$m. The minor (70 $\mu$m) axis of the spot was coaxial with the fiber axis. Enhancement of optical fiber photosensitivity according to the present invention approaches a desirable maximum level without any visible damage to the glass or reduction of mechanical strength of the optical fiber providing the laser power is controlled between about 0.2 mW and about 10 mW.

Formation of refractive index or Bragg gratings in a radiation sensitized optical fiber according to the present invention first requires removal of one or more protective polymer coatings that attenuate the intensity of the beam of the ultraviolet laser used for index of refraction modulation within the core of the sensitized fiber. Known methods of mechanical stripping and chemical stripping provide suitable means for removal of ultraviolet radiation-attenuating polymer coatings to expose the bare surface of an optical fiber, or at least a portion thereof, without cutting or scratching or otherwise physically damaging the fiber surface.

Conversion of the resulting bare optical fiber, to include a refractive index grating, requires exposure of the radiation sensitized portion of the optical fiber to a pattern of ultraviolet radiation using any one of a number of known methods for forming Bragg gratings. A preferred method for forming a Bragg grating according to the present invention uses a frequency doubled, continuous wave (CW) argon ion (Ar$^+$) laser available from Sabre-FreD Coherent Inc, Santa Clara, Calif. The laser, operating at a wavelength of 244 nm, provided the source of ultraviolet radiation used to induce the development of periodic changes of refractive index in the core of a radiation sensitized optical fiber. This process is otherwise known as the writing of a Bragg grating. A preferred Bragg grating fabrication system combines the continuous wave argon ion laser with a Talbot interferometer tuned to the 1550 nm telecommunications window. Gratings were written in radiation sensitized optical fibers at a fixed ultraviolet radiation power level of 100 mW, measured before the interferometer, with a laser beam focused to a spot size of 3 mm×0.1 mm. The development or growth of the grating was monitored in transmission as a function of time during grating inscription using a broadband source (NP2000-ASE-15.5, available from Nuphoton Technologies, Murrieta, Calif.) and an optical spectrum analyzer identified as AQ 6315-A, available from Ando Electric Co. Ltd., Tokyo, Japan. After formation of a grating in the core of the optical fiber, known methods for polymer recoat provide protection for the vitreous surface from which coating was removed previously. Optical fiber annealing after formation of a Bragg grating is not required for optical fibers sensitized by exposure to a pulsed near infrared laser emitting energy pulses less than about 10 mW at femtosecond pulse widths.

The tensile strength of germano-silicate optical fibers was measured for radiation sensitized, coated optical fibers that had been exposed to femtosecond laser pulses. Tensile strength measurement involved the use of an automated axial tension tester and a test procedure in which sensitized optical fibers were wrapped between a pair of cylindrical capstans to provide an exposed length of optical fiber in the center of a 0.5 meter gauge length. From a force level, applied initially to the optical fiber, the strain was increased at a constant strain rate of about 6%/min. Comparison of tensile strength results for radiation sensitized and non-sensitized optical fibers, of the same type, showed that radiation sensitization at femtosecond laser powers exceeding 10 mW had an adverse effect on resulting mechanical strength of optical fibers treated in this way.

A similar effect was observed by visual inspection of optical fibers after exposure to near infrared laser energy from pulsed lasers operating at femtosecond pulse widths. Treated optical fibers were visually inspected to determine evidence of structural damage after exposure to average laser power levels of 10 mW, 50 mW and 150 mW. Selected locations of each optical fiber were subjected to ten passes by a focused laser beam having a spot size of 70 $\mu$m×260 $\mu$m, the minor axis (70 $\mu$m) of the spot being coaxial with the test fiber. During exposure, the femtosecond laser was operated at 1 kHz repetition rate and a scan rate of 250 $\mu$m/second. Clear evidence of damage to treated optical fibers was observed at laser average power settings of 50 mW and 150 mW. Visual damage indicates that the affected optical fiber will have lost a significant amount of its original mechanical strength.

Optical fibers sensitized using an average laser power level of 10 mW showed no visual evidence of damage to the glass. This indicated the need for radiation sensitization of optical fibers using near infrared pulsed lasers operating at average power levels no greater than about 10 mW.

The preferred range for average laser power level, for radiation sensitization of optical fibers, extends from about from about 0.2 mW to about 2 mW using a scan rate between about 1 $\mu$m/sec to 20 $\mu$m/sec to sensitize germano-silicate optical fibers according to the present invention. Two optical fibers, containing different concentrations of germanium oxide, were exposed to varying conditions of average femtosecond laser power and scan rate. Following exposure, Bragg gratings were written in the fibers for 10 minutes using a frequency doubled ultraviolet laser (Sabre-FreD, Coherent Inc., CA) operating at 244 nm with 100 mW power, measured before the interferometer.

The refractive index change, accompanying Bragg grating formation, depends upon development of the grating strength, measured in transmission ($T_{min}$), the Bragg wavelength ($l_B$), and the length of the grating (L) according to the following equation.

$$\Delta n = (\lambda_B/\pi L)\tan h^{-1}(\sqrt{1-T_{min}})$$

EXAMPLE 1

Germano-Silicate Optical Fiber Containing 5 Mole % Germanium Oxide

Table 1, gives the maximum refractive index change following ten minutes exposure of samples of the first optical fiber to a pattern of ultraviolet radiation. The optical fiber was radiation sensitized according to conditions of laser power (mW) and scan rate ($\mu$m/sec) shown in the table.

TABLE 1

Magnitude of Refractive Index Change ($\Delta n$) of Gratings of Example 1

| Scan Rate | Laser Power (mW) | | | | |
|---|---|---|---|---|---|
| ($\mu$m/sec) | 0.2 | 0.4 | 0.6 | 1 | 2 |
| 1.27 | — | $4.12 \times 10^{-5}$ | $7.63 \times 10^{-5}$ | — | — |
| 5.08 | $8.17 \times 10^{-5}$ | $8.67 \times 10^{-5}$ | $4.92 \times 10^{-5}$ | $1.36 \times 10^{-4}$ | — |
| 10.2 | $5.36 \times 10^{-5}$ | $6.72 \times 10^{-5}$ | — | — | $5.25 \times 10^{-5}$ |

The largest index of refraction modulation change for optical fibers containing 5 mole % of germanium oxide occurred when the pulsed near infrared laser operated at an average laser power of 1.0 mW and a scan rate of 5.08 $\mu$m/second. Maximum refractive index change in optical fibers of Example 1 increases with increase in the average sensitization laser power and has an optimum scan rate of 5.08 $\mu$m/second. Optical fibers sensitized under optimum conditions gave the strongest Bragg gratings as shown by the refractive index change of $1.36 \times 10^{-4}$.

EXAMPLE 2

Germano-Silicate Optical Fiber Containing 10 Mole % Germanium Oxide

Table 2, gives the maximum refractive index change following ten minutes exposure of samples of the second optical fiber to a pattern of ultraviolet radiation. As before, samples of optical fiber were radiation sensitized according to conditions of laser power (mW) and scan rate ($\mu$m/sec) shown in the table.

TABLE 2

Magnitude of Refractive Index Change (Δn) of Gratings of Example 2

| Scan Rate (μm/sec) | Laser Power (mW) | | | | | |
|---|---|---|---|---|---|---|
| | 0.2 | 0.4 | 0.6 | 0.8 | 1 | 2 |
| 1.27 | — | — | $2.41 \times 10^{-4}$ | $2.02 \times 10^{-4}$ | — | — |
| 5.08 | $3.49 \times 10^{-4}$ | — | $4.08 \times 10^{-4}$ | $4.39 \times 10^{-4}$ | $4.5 \times 10^{-4}$ | $3.12 \times 10^{-4}$ |
| 10.2 | $3.60 \times 10^{-4}$ | $3.04 \times 10^{-4}$ | $2.73 \times 10^{-4}$ | — | $3.31 \times 10^{-4}$ | $3.23 \times 10^{-4}$ |

Results from Table 2 indicate that optimum radiation sensitization of optical fibers containing 10 mole % germanium oxide occurs at a scan rate of about 5.0 μm/second using an average laser power between about 0.6 mW and about 1.0 mW.

The stability of refractive index gratings formed in optical fibers of Example 2 was compared with the stability of gratings written in similar fibers sensitized by hydrogen loading. Table 3 shows that, after high temperature annealing at 300° C., optical fibers E2:1 and E2:2 (see Table 3) of Example 2 lose only 2% of their strength compared to the hydrogen loaded sample C1 that decreased by 12%. The gratings written in femtosecond laser sensitized fibers (E2:1 and E2:2) exhibit increased stability since the loss of Bragg grating strength is smaller than the decrease in the grating refractive index in standard hydrogen loaded fibers. The enhanced thermal stability of the gratings written in femtosecond laser sensitized fiber eliminates the post-fabrication annealing step of the gratings, to stabilize their index change.

TABLE 3

Strength Loss in Gratings Due to Annealing

| | Sensitized Optical Fiber | | |
|---|---|---|---|
| | E2:1 | E2:2 | C1 |
| Initial Grating Strength (dB) | 4 | 5 | 20 |
| Percent Loss after Annealing at 300° C. for 10 minutes. | 2% | 2% | 12% |

Radiation sensitized germano-silicate optical fibers have been described herein with particular reference to the use of sensitizing lasers producing pulsed infrared radiation at femtosecond pulse widths. Other variations in processes and materials, which will be appreciated by those skilled in the art, are within the intended scope of this invention as claimed below.

What is claimed is:

1. A process for fabricating a radiation sensitized optical fiber containing at least one portion having increased sensitivity to ultraviolet radiation, said process comprising the steps of:

forming an optical fiber from a pre-form comprising germano-silicate glass;

coating said optical fiber with at least one buffer to protect said optical fiber; and exposing said at least one portion of said optical fiber to pulsed energy from a near infrared laser generating pulses at femtosecond pulse widths of 100 fsec, and a repetition frequency of 1 kHz to provide said radiation sensitized optical fiber.

2. A process for fabricating a refractive index grating in the core of a radiation sensitized optical fiber containing at least one portion having increased sensitivity to ultraviolet radiation, said process comprising the steps of:

forming an optical fiber from a pre-form comprising germano-silicate glass;

coating said optical fiber with at least one buffer to protect said optical fiber;

exposing said at least one portion of said optical fiber to pulsed energy from a near infrared laser generating pulses at femtosecond pulse widths of 100 fsec, and a repetition frequency of 1 kHz to provide said radiation sensitized optical fiber;

removing said at least one buffer from said at least one portion of said radiation sensitized optical fiber; and exposing said at least one portion to a pattern of ultraviolet radiation to produce a periodic variation of refractive index in said at least one portion of said radiation sensitized optical fiber to provide said refractive index grating.

* * * * *